United States Patent
Yamamoto et al.

(10) Patent No.: US 12,548,689 B2
(45) Date of Patent: Feb. 10, 2026

(54) CONDUCTIVE FILM AND MANUFACTURING METHOD OF CONDUCTIVE FILM

(71) Applicants: DENSO CORPORATION, Kariya (JP); National University Corporation Tokai National Higher Education and Research System, Nagoya (JP)

(72) Inventors: Takahisa Yamamoto, Nagoya (JP); Tomoharu Tokunaga, Nagoya (JP); Ryota Kono, Nagoya (JP); Kouhei Hieda, Nagoya (JP); Yasuyuki Hikita, Kariya (JP); Kazuhiko Kano, Kariya (JP)

(73) Assignees: DENSO CORPORATION, Kariya (JP); National University Corporation Tokai National Higher Education and Research System, Nagoya (JP)

( * ) Notice: Subject to any disclaimer, the term of this patent is extended or adjusted under 35 U.S.C. 154(b) by 225 days.

(21) Appl. No.: 18/421,726

(22) Filed: Jan. 24, 2024

(65) Prior Publication Data
US 2024/0161940 A1 May 16, 2024

Related U.S. Application Data

(63) Continuation of application No. PCT/JP2022/031614, filed on Aug. 22, 2022.

(30) Foreign Application Priority Data

Aug. 27, 2021 (JP) ................................. 2021-139234

(51) Int. Cl.
*H01B 1/08* (2006.01)
*B05D 5/12* (2006.01)
*H01B 13/00* (2006.01)

(52) U.S. Cl.
CPC ................. *H01B 1/08* (2013.01); *B05D 5/12* (2013.01); *H01B 13/003* (2013.01)

(58) Field of Classification Search
CPC ... H01B 1/00; H01B 1/08; B05D 5/12; C01G 23/04
See application file for complete search history.

(56) References Cited

U.S. PATENT DOCUMENTS 6,468,498 B1 * 10/2002 Lee ........................ C01G 53/82
423/619
10,629,322 B2 * 4/2020 Kozuka ................ G01N 29/022

OTHER PUBLICATIONS

Kitada et al "Selective Preparation of Macroporous Monoliths of Conductive Titanium Oxides TinO2n-1 (n=2, 3, 4, 6)", dx.doi.org/10.1021/ja302083n | J. Am. Chem. Soc. 2012, 134, 10894-10898.*

(Continued)

*Primary Examiner* — Mark Kopec
(74) *Attorney, Agent, or Firm* — Posz Law Group, PLC

(57) ABSTRACT

A conductive film includes a metal oxide as a main component. The metal oxide contains the same components as components of a compound represented by a formula (I):

$$(AO)_2B_6O_{11} \qquad (I)$$

where A in the formula (I) is a metal element capable of having a valence of +1 or +2, B in the formula (I) is a transition metal element capable of having a valence of +4 or +5, O in the formula (I) is an oxygen element, and an average valence of B in the formula (I) is less than the maximum oxidation number of B. The metal oxide has a crystal structure in which diffraction peaks in an X-ray diffraction pattern of the metal oxide appear at same diffraction angles as diffraction angles at which diffraction peaks in an X-ray diffraction pattern of the compound represented by the formula (I) appear.

8 Claims, 14 Drawing Sheets

(56) References Cited

OTHER PUBLICATIONS

Malyi et al "Hole antidoping of oxides", Physical Review B 101, 235202 (2020).*
Form PCT/ISA/210 (mailed Oct. 11, 2022).*
Form PCT/ISA/237 (mailed Oct. 11, 2022).*
K. Yoshimatsu et al., "Large anisotropy in conductivity of $Ti_2O_3$ films" APL Materials, vol. 6, No. 101101, https://doi.org/10.1063/1.5050823, pp. 101101-1 to 101101-8, Published Online: Oct. 1, 2018.
V.Schmachtel et al.,"About a barium oxotitanate(III, IV):$Ba_2Ti_6O_{13}$," Z. anorg. allg. Chem., 435 pp. 243-246, 1977.

\* cited by examiner

FIG. 3A
○ Ba
◌ Ti
∘ O
↑ ↑
d  e
FIG. 3B
○ Ba
∘ O
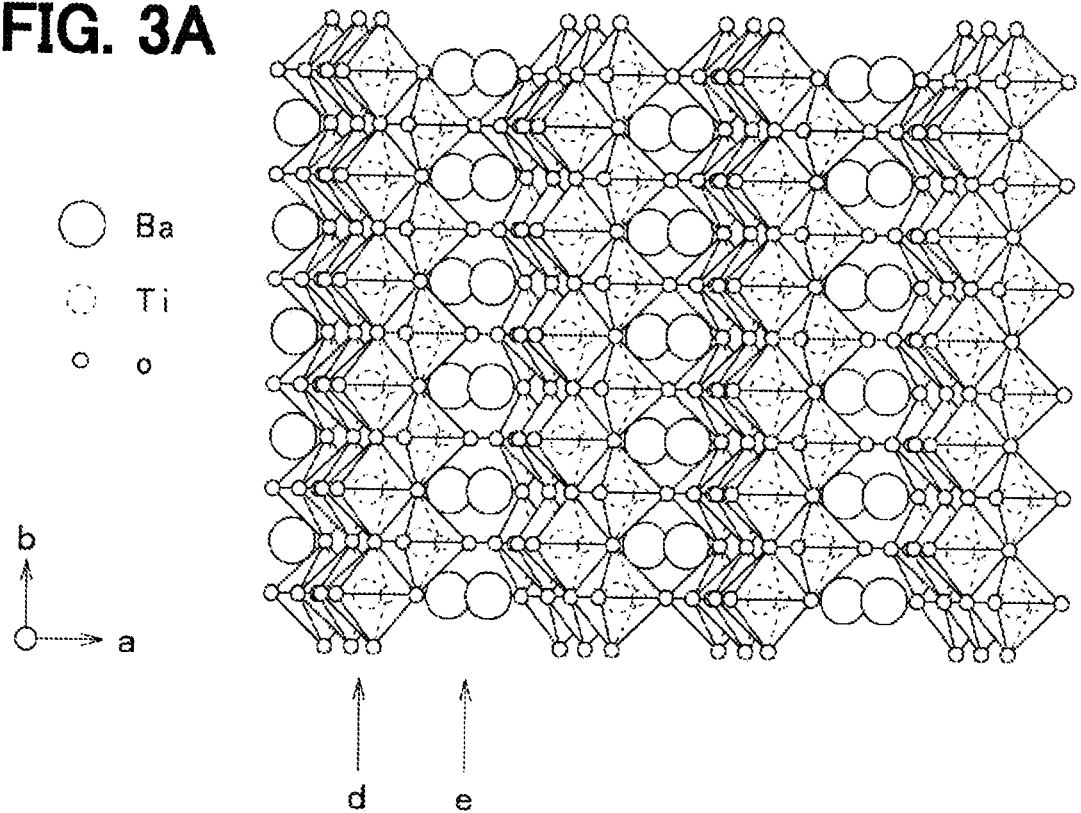
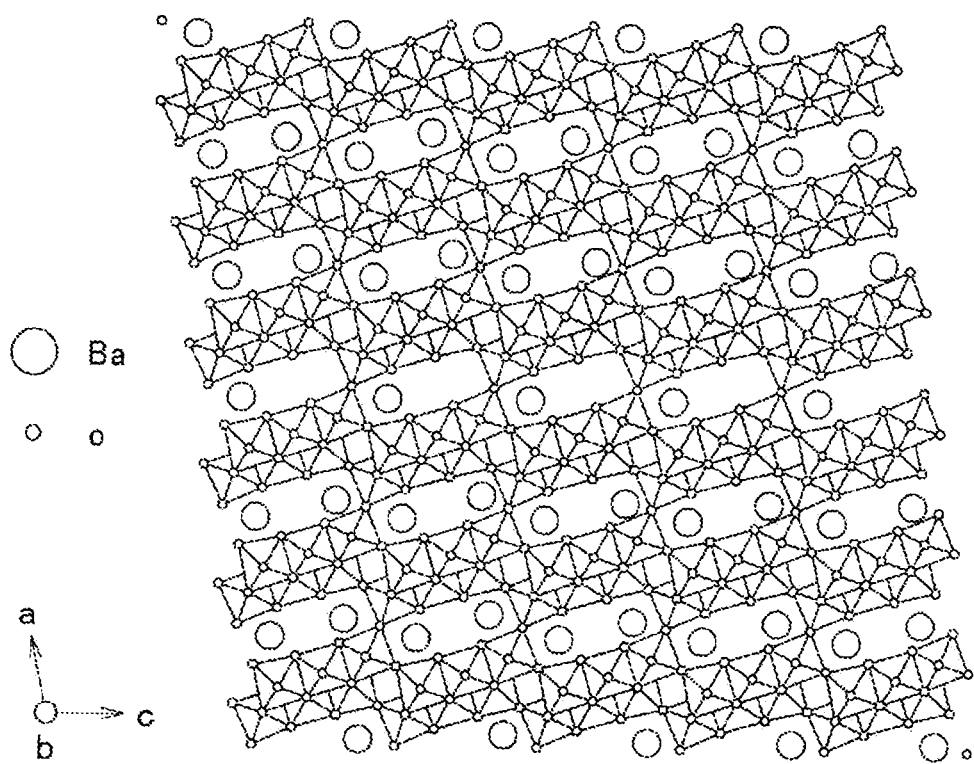

FIG. 7A  BF-STEM IMAGE
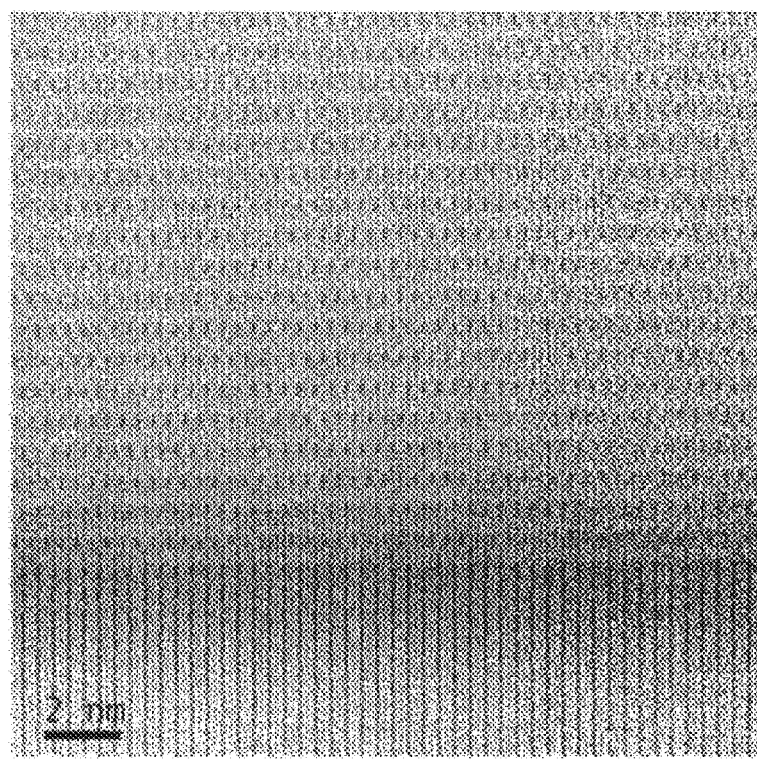
THIN FILM
SUBSTRATE
FIG. 7B  HAADF-STEM IMAGE
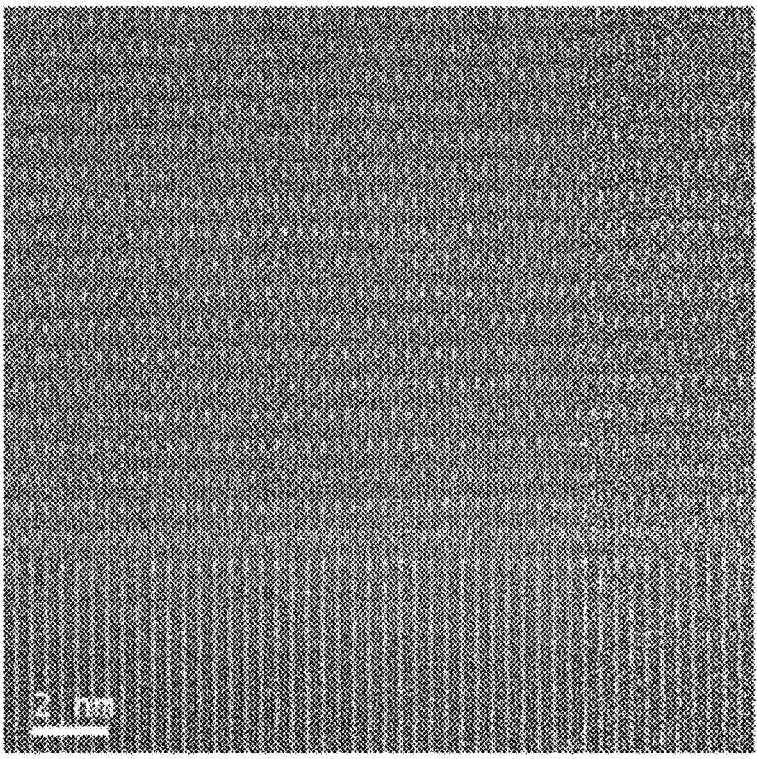
THIN FILM
SUBSTRATE c-AXIS DIRECTION a-AXIS DIRECTION b-AXIS DIRECTION c-AXIS DIRECTION

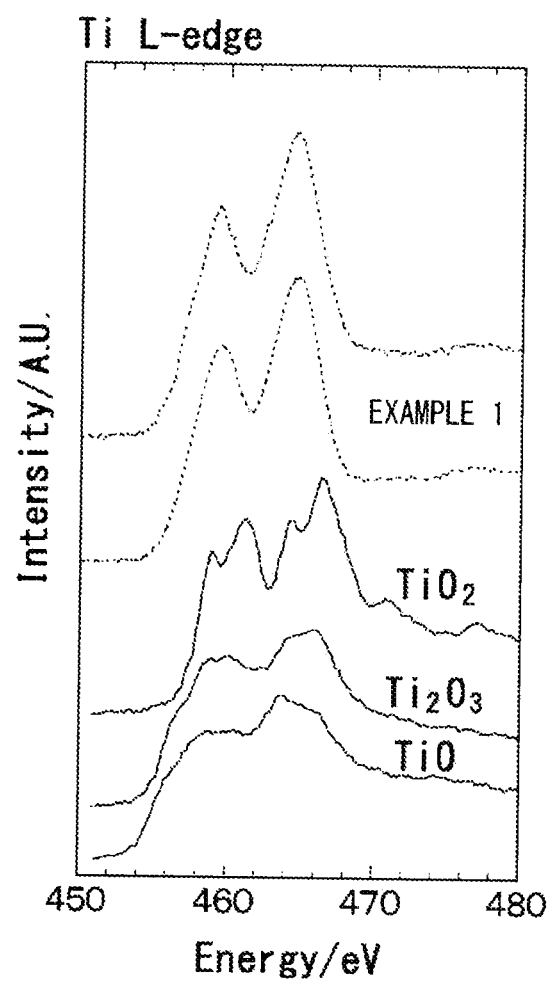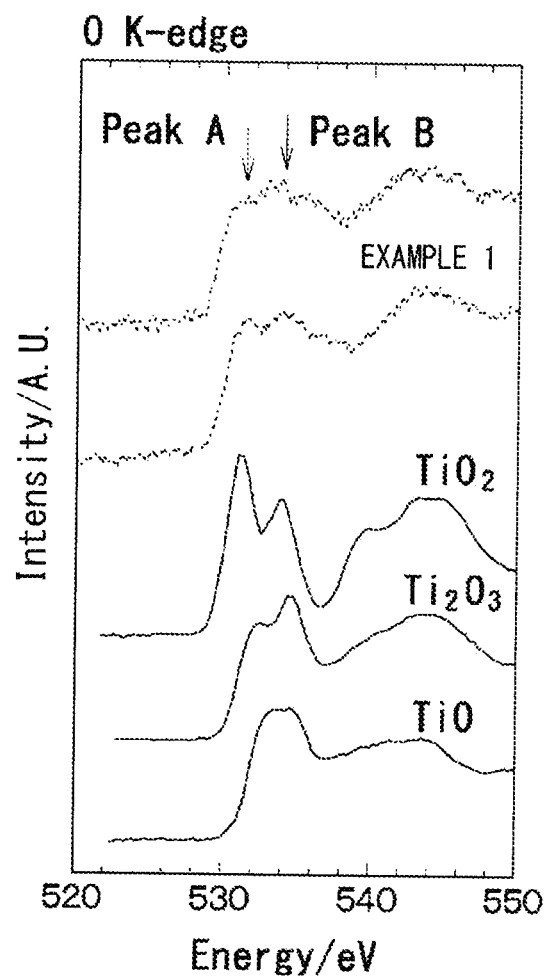

CONDUCTIVE FILM AND MANUFACTURING METHOD OF CONDUCTIVE FILM

CROSS REFERENCE TO RELATED APPLICATIONS

The present application is a continuation application of International Patent Application No. PCT/JP2022/031614 filed on Aug. 22, 2022, which designated the U.S. and claims the benefit of priority from Japanese Patent Application No. 2021-139234 filed on Aug. 27, 2021. The entire disclosures of all of the above applications are incorporated herein by reference.

TECHNICAL FIELD

The present disclosure relates to a conductive film containing a metal oxide as a main component and a manufacturing method of the conductive film.

BACKGROUND

In recent years, functional devices have been developed for stable supply of resources and sustainable society. A physical element such as a solar cell, a transistor, a memory element, a thermoelectric element, or a physical sensor includes a plurality of laminated thin films. The plurality of thin films includes a film made of an oxide of a transition metal as an element material. On the film made of the element material, an electrode formed of a conductive film having high electrical conductivity is laminated. It is preferable that the conductive film contains, as a main component, a conductive metal oxide having a crystal structure and a chemical bond similar to those of the element material.

SUMMARY

According to an aspect of the present disclosure, a conductive film includes a metal oxide as a main component, the metal oxide contains the same components as components of a compound represented by a formula (I):

where A in the formula (I) is a metal element capable of having a valence of +1 or +2, B in the formula (I) is a transition metal element capable of having a valence of +4 or +5, O in the formula (I) is an oxygen element, and an average valence of B in the formula (I) is less than the maximum oxidation number of B. The metal oxide has a crystal structure in which diffraction peaks in an X-ray diffraction pattern of the metal oxide appear at the same diffraction angles as diffraction angles at which diffraction peaks in an X-ray diffraction pattern of the compound represented by the formula (I) appear.

According to another aspect of the present disclosure, a manufacturing method of a conductive film that includes a metal oxide as a main component is provided. The metal oxide has the same components as components of a compound represented by a formula (I):

where A in the formula (I) is a metal element capable of having a valence of +1 or +2, B in the formula (I) is a transition metal element capable of having a valence of +4 or +5, O in the formula (I) is an oxygen element, and an average valence of B in the formula (I) is less than the maximum oxidation number of B. The metal oxide has a crystal structure in which diffraction peaks in an X-ray diffraction pattern of the metal oxide appear at the same diffraction angles as diffraction angles at which diffraction peaks in an X-ray diffraction pattern of the compound represented by the formula (I) appear. The manufacturing method includes preparing a base member, and forming the conductive film on a surface of the base member by a laser ablation method performed in an atmosphere containing oxygen gas and performed using a target containing the same element as A in the formula (I) and the same element as B in the formula (I).

BRIEF DESCRIPTION OF DRAWINGS

Objects, features and advantages of the present disclosure will become apparent from the following detailed description made with reference to the accompanying drawings. In the drawings:

FIG. 3A is a diagram showing a crystal structure of $(BaO)_2Ti_6O_{11}$ viewed in a direction parallel to a c-axis;

FIG. 3B is a diagram showing a crystal structure of $(BaO)_2Ti_6O_{11}$ viewed in a direction parallel to a b-axis;

FIG. 7A is a diagram showing a bright field image (BF-STEM image) of the thin film of $(BaO)_2Ti_6O_{11}$ observed with a scanning transmission electron microscope (STEM);

FIG. 7B is a diagram showing a high angle annular dark field image (HAADF-STEM image) of the thin film of $(BaO)_2Ti_6O_{11}$ observed with the STEM;

FIG. 15A is a graph showing L-edge spectra of Ti obtained by an electron energy loss spectroscopy (EELS);

FIG. 15B is a diagram showing K-edge spectra of O obtained by the EELS; and

DETAILED DESCRIPTION

Figure 1:
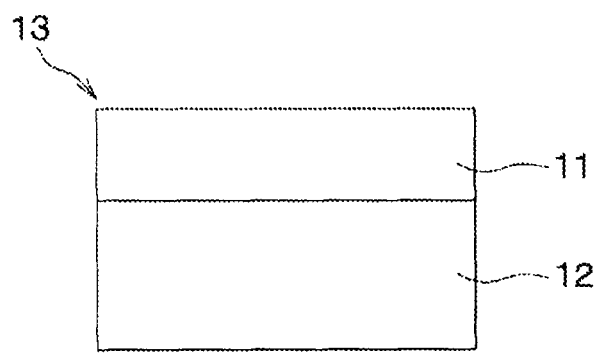
FIG. 1 is a cross-sectional view of a conductive film laminated body in which a conductive film according to an embodiment and a substrate are laminated.

Next, a comparative example is described only for understanding the following embodiments. A conductive film according to the comparative example is mainly composed of $Ti_2O_3$ in which a ratio of Ti to O is smaller than that of $TiO_2$. An electrical conductivity of the conductive film is $1.7 \times 10^3$ S·cm$^{-1}$. This film is formed on an insulating substrate by laser ablation of a $Ti_2O_3$ sintered body as a raw material at 1000° C. under an oxygen partial pressure of $1 \times 10^{-3}$ Torr.

However, the electrical conductivity of the conductive film that contains the above-described conductive metal oxide as a main component is low, and is 1/250 of the electrical conductivity of aluminum and 1/352 of the electrical conductivity of copper, which are elemental metals. When the electrical conductivity of the conductive film is low, significant heat generation and power loss of a device are caused. Therefore, it is desirable to provide a conductive film containing a conductive metal oxide as a main component and having higher electrical conductivity than conductive film of the comparative example.

According to an aspect of the present disclosure, a conductive film includes a metal oxide as a main component, the metal oxide contains the same components as components of a compound represented by a formula (I):

where A in the formula (I) is a metal element capable of having a valence of +1 or +2, B in the formula (I) is a transition metal element capable of having a valence of +4 or +5, O in the formula (I) is an oxygen element, and an average valence of B in the formula (I) is less than the maximum oxidation number of B. The metal oxide has a crystal structure in which diffraction peaks in an X-ray diffraction pattern of the metal oxide appear at the same diffraction angles as diffraction angles at which diffraction peaks in an X-ray diffraction pattern of the compound represented by the formula (I) appear.

The conductive metal oxide used for the conductive film of the comparative example has a structure in which donor impurities and regular oxygen vacancies are introduced into an insulating structure in which $BO_6$ octahedrons are three-dimensionally connected so that a valence of B is less than the maximum oxidation number. However, these donor impurities and oxygen vacancies are present in the $BO_6$ octahedrons which are conduction paths of electrons. Therefore, the donor impurities and the oxygen vacancies act as scatterer of electrons inside the $BO_6$ octahedrons, and hinder the improvement of the electrical conductivity. This is the reason why the electrical conductivity of the conductive film of the comparative example that contains the conductive metal oxide as the main component is low.

In contrast, in the conductive metal oxide used for the conductive film of the above aspect, one or more metal elements are added to a binary oxide of a transition metal element that is capable of having a valence of +4 or +5. As a result, the metal oxide of the has a crystal structure in which unit structures in each of which $BO_6$ octahedrons are connected in layers are repeatedly arranged, and an element A in the formula (I) is present in a gap between the unit structures. Accordingly, the element A as a donor impurity for supplying electrons is present outside the unit structures. That is, a donor impurity serving as an electron scatterer is not present inside the $BO_6$ octahedrons of the unit structures. Therefore, electrons can be conducted inside the clean $BO_6$ octahedrons with less disturbance of the unit structures. Therefore, it is possible to provide the conductive film containing the conductive metal oxide as the main component, and having higher electrical conductivity than the conductive film of the comparative example.

According to another aspect of the present disclosure, a manufacturing method of a conductive film that includes a metal oxide as a main component is provided. The metal oxide has the same components as components of a compound represented by a formula (I):

where A in the formula (I) is a metal element capable of having a valence of +1 or +2, B in the formula (I) is a transition metal element capable of having a valence of +4 or +5, O in the formula (I) is an oxygen element, and an average valence of B in the formula (I) is less than the maximum oxidation number of B. The metal oxide has a crystal structure in which diffraction peaks in an X-ray diffraction pattern of the metal oxide appear at the same diffraction angles as diffraction angles at which diffraction peaks in an X-ray diffraction pattern of the compound represented by the formula (I) appear. The manufacturing method includes preparing a base member, and forming the conductive film on a surface of the base member by a laser ablation method performed in an atmosphere containing oxygen gas and performed using a target containing the same element as A in the formula (I) and the same element as B in the formula (I).

The electrical conductivity of the conductive film manufactured by this manufacturing method is higher than that of the conductive film of the comparative example. Therefore, according to this manufacturing method, it is possible to manufacture the conductive film containing the conductive metal oxide as the main component and having higher electrical conductivity than the conductive film of the comparative example.

A conductive film 11 according to an embodiment of the present disclosure will be described with reference to FIG. 1. The conductive film 11 shown in FIG. 1 is a film having electrical conductivity. The conductive film 11 may be a thin film having a film thickness of about 2 μm or less. The conductive film 11 provides electrical contact with one or more materials deposited thereon. The conductive film 11 is used as an electrode of a physical element such as a solar cell, a transistor element, a memory element, a thermoelectric element, and a physical sensor element.

As shown in FIG. 1, the conductive film 11 is deposited on a substrate 12 in contact with a surface of the substrate 12. The conductive film 11 constitutes a conductive film laminated body 13 in which the conductive film 11 and the substrate 12 are laminated. The conductive film 11 has an outer shape corresponding to a shape of the substrate 12 (for example, a rectangular flat plate shape, a disk shape, or the like). The substrate 12 has a main surface and a rear surface. The conductive film 11 is deposited on the main surface of the substrate 12.

The conductive film 11 contains a metal oxide as a main component. It should be noted that "containing a metal oxide as a main component" means that the metal oxide is contained at an amount of 90 atomic % or more with respect to the entire conductive film 11. Therefore, the conductive film 11 may be formed of only the metal oxide, the conductive film 11 may contain impurities or the like caused by a raw material of the metal oxide in addition to the metal oxide, or a small amount of other components may be added to the conductive film 11 in a process of forming the metal oxide.

The metal oxide of the present embodiment contained as the main component in the conductive film 11 has a compound represented by the following formula (I) as a basic composition:

$$(AO)_2B_6O_{11} \quad (I)$$

where A in the formula (I) is a metal capable of having a valence of +1 or +2, B in the formula (I) is a transition metal element capable of having a valence of +4 or +5, O in the formula (I) is an oxygen element, and the average valence of B in the formula (I) is less than the maximum oxidation number of B.

The metal oxide of the present embodiment has a predetermined crystal structure. First, a crystal structure of $(BaO)_2Ti_6O_{11}$, which is an example of the compound of the formula (I), will be described. $(BaO)_2Ti_6O_{11}$ is a compound in which A in the formula (I) is Ba and B in the formula (I) is Ti.

Figure 2:
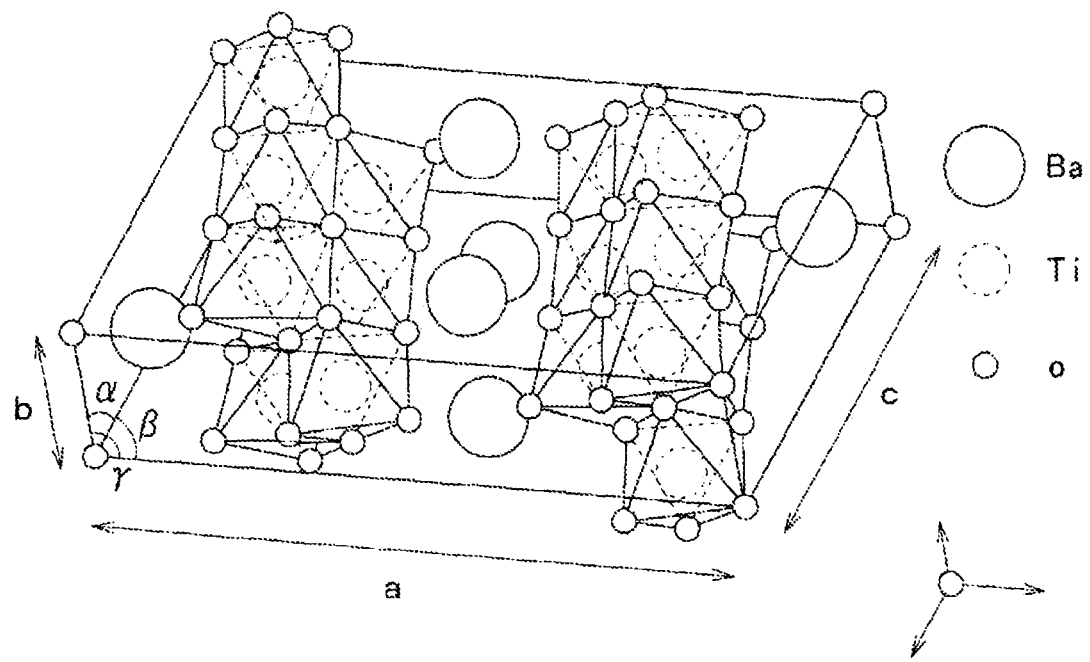
FIG. 2 is a diagram showing a unit cell of $(BaO)_2Ti_6O_{11}$.

FIG. 2 shows a unit cell of $(BaO)_2Ti_6O_{11}$. Lattice constants of powdered $(BaO)_2Ti_6O_{11}$ are a=15.16 Å, b=3.893 Å, c=9.093 Å, α=90°, β=98.6°, γ=90°.

Ba has a valence of +2, and O has a valence of −2. In consideration of this fact, Ti in the crystal of $(BaO)_2Ti_6O_{11}$ includes Ti having a valence of +3 in addition to Ti having a valence of +4 which is a general valence. With this change in valence, the valence of ions in the crystal of $(BaO)_2Ti_6O_{11}$ can be expressed as $(Ba^{2+}O^{2-})_2(Ti^{4+}_4, Ti^{3+}_2)O^{2-}_{11}$. In $(BaO)_2Ti_6O_{11}$, the valence of O as a whole is (−2)×13=−26, and the valence of Ba as a whole is (+2)×2=+4. In order to maintain charge neutrality, the valence of Ti as a whole is +22. The average valence of Ti in $(BaO)_2Ti_6O_{11}$ is +22÷6≈+3.7. Thus, the average valence of Ti is smaller than +4, which is the maximum oxidation number of Ti. As described above, when the average valence of Ti is less than the maximum oxidation number of Ti, electrons capable of being conducted are secured, and high electrical conductivity is obtained.

FIG. 3A shows the crystal structure of $(BaO)_2Ti_6O_{11}$ viewed in a direction parallel to a c-axis. FIG. 3B shows the crystal structure of $(BaO)_2Ti_6O_{11}$ viewed in a direction parallel to a b-axis. As shown in FIG. 2, FIG. 3A, and FIG. 3B, $(BaO)_2Ti_6O_{11}$ has a crystal structure in which unit structures, in each of which $TiO_6$ octahedrons are connected in layers, are repeatedly arranged, and Ba is present in a gap between the unit structures. Some of the $TiO_6$ octahedrons are $TiO_5$ octahedrons. In FIG. 2, the $TiO_6$ octahedrons are connected in one direction to form a $TiO_6$ octahedron group, and a portion where the $TiO_6$ octahedron groups overlap is the unit structure. In the crystal structure shown in FIG. 3A, a portion indicated by an arrow d is the unit structure in which $TiO_6$ octahedrons are connected in layers. In a portion indicated by an arrow e in the crystal structure shown in FIG. 3A, the unit structure and the unit structure are connected by Ba—O bonding.

The metal oxide of the present embodiment has the same crystal structure as $(BaO)_2Ti_6O_{11}$.

The metal oxide of the present embodiment is not limited to a compound in which B in the formula (I) is only Ti, and may be a compound in which B in the formula (I) contains Ti and an element different from Ti. The element different from Ti is one or more elements selected from a group consisting of V (vanadium), Cr (chromium), Mn (manganese), Fe (iron), Co (cobalt), Nb (niobium), Ru (ruthenium), Pd (palladium), Ta (tantalum), W (tungsten), Mo (molybdenum), Re (rhenium), Os (osmium), Ir (iridium), and Pt (platinum). These elements are metal elements known to have a valence of +2 to +4 and have an ionic radius of 0.60 Å to 0.675 Å. The element different from Ti partially replaces Ti in the compound of formula (I) in which B is only Ti. Therefore, as the element different from Ti, an element included in a range of an ionic radius of 0.60 Å (+4 valence) to 0.675 Å (+3 valence) corresponding to a valence that Ti is capable of having is selected.

In addition, the metal oxide of the present embodiment may be a compound in which B in Formula (I) is only at least one of Ta or Nb that is capable of having a valence of +5. Both $Ta^{5+}$ and $Nb^{5+}$ have an ionic radius close to that of $Ti^{4+}$. Therefore, it is considered that this compound also has the same crystal structure as $(BaO)_2Ti_6O_{11}$.

In the metal oxide of the present embodiment, B in the formula (I) may be a compound containing at least one of Ta or Nb, and an element different from Ta and Nb. The element different from Ta and Nb is one or more elements selected from Ti (titanium), V (vanadium), Mn (manganese), Fe (iron), Co (cobalt), Ru (ruthenium), Rh (rhodium), Ir (iridium), Mo (molybdenum), and W (tungsten). These elements are metal elements known to have a valence of +2 to +4 and have an ionic radius of 0.64 Å to 0.68 Å. The element different from Ta and Nb partially replaces B for a compound in which B in Formula (I) is only at least one of Ta or Nb. Therefore, as the element different from Ta and Nb, an element included in a range of an ionic radius of 0.64 Å (+5 valence) to 0.68 Å (+4 valence) corresponding to a valence that both Ta and Nb are capable of having is selected. Therefore, it is considered that the compound in this case also has the same crystal structure as $(BaO)_2Ti_6O_{11}$.

In order to form the same crystal structure as $(BaO)_2Ti_6O_{11}$, A in the formula (I) is an alkali metal element or an alkaline earth metal element having an ionic radius in a range of 0.78 Å to 1.73 Å. Specifically, A in the formula (I) is one or more elements selected from a group consisting of Ca (calcium), Sr (strontium), Ba (barium), Na (sodium), K (potassium), Rb (rubidium), and Cs (cesium). The element A functions as a donor impurity that supplies electrons. Therefore, the element A is an alkali metal or an alkaline earth metal elements having a small electronegativity. Furthermore, the element A is located in the gap between the layered unit structures formed by the $TiO_6$ octahedrons. For the ionic radii 0.60 Å (+4 valence) and 0.67 Å (+3 valence) corresponding to the valences that Ti is capable of having, calculated values of a distance of the gap in which Ba element is present in the same crystal structure as $(BaO)_2Ti_6O_{11}$ are 3.46 Å and 3.12 Å, respectively. In order for the element A to be stably present in the gap, the distance of the gap is preferably 2 to 4 times the ionic radius of the element A. If the distance of the gap is less than 2 times, the element A cannot enter the gap and causes a change in the crystal structure. If the distance of the gap is 4 times or more, the element A does not fit in a stable atomic position and moves in the gap, and a stable crystal structure cannot be obtained. Under these conditions, the ionic radius of the element A is determined to be 0.78 Å to 1.73 Å.

A general metal oxide has non-stoichiometry due to a vacancy of an oxygen atom, substitution of a metal element, a change in valence of the metal element, and the like. Also in the metal oxide of the present embodiment, a deviation of a composition ratio from the basic composition $(AO)_2B_6O_{11}$ is allowed within a range in which the metal oxide has the same crystal structure as that of the compound represented by the formula (I). Therefore, the metal compound of the present embodiment has the same components as those of the compound represented by the formula (I), and has a crystal structure in which diffraction peaks in an X-ray diffraction pattern of the metal compound appear at the same diffraction angles as diffraction angles at which diffraction peaks in an X-ray diffraction pattern of the compound represented by the formula (I) appear. Here, the description "the metal compound of the present embodiment has the same components as the components of the compound represented by the formula (I)" specifies the types of elements constituting the metal oxide of the present embodiment. That is, this description means that the metal oxide of the present embodiment contains the element A in the formula (I), the element B in the formula (I), and an oxygen element as components. In addition, the description "the metal compound of the present embodiment has a crystal structure in which diffraction peaks in an X-ray diffraction pattern of the metal compound appear at the same diffraction angles as diffraction angles at which diffraction peaks in an X-ray diffraction pattern of the compound represented by the formula (I) appear" specifies the composition ratio of the metal compound of the present embodiment. According to this description, the composition ratio of the metal compound of the present embodiment may deviate from $(AO)_2B_6O_{11}$ as long as the metal compound has the same crystal structure as the compound represented by the formula (I). Therefore, from these descriptions, the metal compound of the present embodiment includes not only the compound represented by the formula (I) but also a compound having a composition ratio deviated from $(AO)_2B_6O_{11}$ within a range having the same crystal structure as the compound represented by the formula (I).

The substrate 12 is a base member used for forming the conductive film 11. The base member supports the conductive film 11. The substrate 12 has a crystalline structure. A distance in one direction in the main surface of the substrate 12 is Ds. In the crystal structure of the substrate 12, a value of an integer multiple of Ds is preferably within ±7% of the values of b and c, which are the lattice constants of the compound of the formula (I). A crystal plane of the main surface of the substrate 12 is preferably a (210) plane of $SrTiO_3$, $KTaO_3$, $BaTiO_3$, $DyScO_3$, $GaScO_3$, $LaAlO_3$, $NdGaO_3$, $(LaAlO_3)_{0.3}$–$(SrAl_{0.5}Ta_{0.5}O_3)_{0.7}$ (LSAT), or the like. In examples described later, a thin film of $(BaO)_2Ti_6O_{11}$ is formed on the (210) plane of the substrate 12 made of $SrTiO_3$. In this case, a value of an integral multiple of the lattice spacing Ds of the (210) plane of the substrate 12 of $SrTiO_3$ is +0.5% with respect to b and −4% with respect to c, which are the lattice constants of $(BaO)_2Ti_6O_{11}$.

Figure 4:
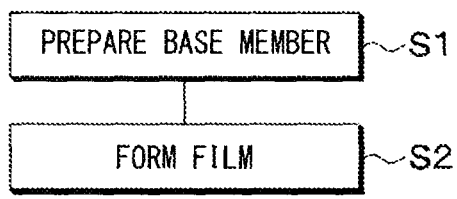
FIG. 4 is a flow chart showing a manufacturing method of the conductive film according to the embodiment.

As shown in FIG. 4, a manufacturing method of the conductive film 11 of the present embodiment includes a base member preparing process S1 and a film forming process S2. In the base member preparing process S1, the substrate 12 as the base member is prepared. The substrate 12 contains at least one selected from a group consisting of $SrTiO_3$, $KTaO_3$, $BaTiO_3$, $DyScO_3$, $GaScO_3$, $LaAlO_3$, $NdGaO_3$, and $(LaAlO_3)_{0.3}$—$(SrAl_{0.5}Ta_{0.5}O_3)_{0.7}$(LSAT).

In the film forming process S2, the conductive film 11 is formed on a surface of the base member. In a case where the substrate 12 is prepared as the base member, the conductive film 11 is formed on the main surface of the substrate 12. The conductive film 11 is formed in an atmosphere containing oxygen gas by a laser ablation method using a target containing the same element as A in the formula (I) and the same element as B in the formula (I). The formation of the conductive film 11 is not limited thereto, and may be performed by another method capable of forming a film having crystallinity. Examples of other methods include a sputtering method, a molecular beam epitaxy (MBE) method, a sol-gel method, and various chemical vapor deposition (CVD) methods. The method of forming the conductive film 11 is adopted in consideration of the film quality and film thickness to be formed. In this manner, the conductive film 11 is formed.

In the base member preparing process S1, a member in which one or more layers of films are formed on the main surface of the substrate 12 may be prepared as the base member. In this case, in the film forming process S2, the conductive film 11 is formed on a surface of the film on the main surface of the substrate 12. The conductive film 11 may be transferred to another member after being formed on the surface of the base member such as the substrate 12. The conductive film 11 is not necessarily used integrally with the base member such as the substrate 12, and may be used separately from the base member.

As described above, the conductive film 11 contains the metal oxide of the present embodiment as the main component. The metal oxide of the present embodiment contains the same components as the components of the compound represented by the formula (I), and has the crystal structure in which the diffraction peaks in the x-ray diffraction pattern of the metal oxide appears at the same diffraction angles as the diffraction angles at which the diffraction peaks in the X-ray diffraction pattern of the compound represented by the formula (I) appear.

The conductive metal oxide used for the conductive film of the comparative example has a structure in which donor impurities and regular oxygen vacancies are introduced into an insulating structure in which $BO_6$ octahedrons are three-dimensionally connected so that the valence of B is less than the maximum oxidation number. Examples of the element B include titanium, tantalum, and niobium. For example, in a case where the element B is Ti, a series of conductive metal oxides represented by $Ti_nO_{2n-1}$ including $Ti_2O_3$, $Ti_4O_7$, and the like in which donor impurities of Nb or tin or oxygen deficiencies are introduced into insulating $TiO_2$ can be used. However, these donor impurities and oxygen vacancies are present in the $BO_6$ octahedrons which are conduction paths of electrons. Therefore, the donor impurities or the oxygen vacancies act as scatterer of electrons inside the $BO_6$ octahedrons, and hinder the improvement of the electrical conductivity. This is the reason why the electrical conductivity of the conductive film of the comparative example that contains the conductive metal oxide as the main component is low.

In contrast, in the metal oxide of the present embodiment, one or more metal elements are added to a binary transition metal oxide of a transition metal element that is capable of having a valence of +4 or +5. Thus, the metal oxide of the present embodiment has a crystal structure in which the unit structures, in each of which $BO_6$ octahedrons are connected in layers, are repeatedly arranged, and the element A is present in the gap between the unit structures. Accordingly, the element A as the donor impurity for supplying electrons is present outside the unit structures. That is, the donor impurity serving as an electron scatterer is not present inside the $BO_6$ octahedrons of the unit structures. Therefore, electrons can be conducted inside the clean $BO_6$ octahedrons with less disturbance of the unit structures. Therefore, it is possible to provide the conductive film 11 containing the conductive metal oxide as the main component and having higher electrical conductivity than the conductive film of the comparative example.

The manufacturing method of the conductive film 11 of the present embodiment includes preparing the substrate 12, and forming the conductive film 11 on the surface of the substrate 12 by the laser ablation method performed in the atmosphere containing oxygen gas and performed using the target containing the same element as A in the formula (I) and the same element as B in the formula (I). The electrical conductivity of the conductive film of the present embodiment manufactured by this manufacturing method is higher than that of the conductive film of the comparative example as described above. Therefore, according to this manufacturing method, it is possible to manufacture the conductive film containing the conductive metal oxide as the main component and having higher electrical conductivity than the conductive film of the comparative example.

The electrical conductivity of the conductive film 11 of the present embodiment is higher than that of the conductive film of the comparative example containing the metal oxide as the main component. Therefore, when the electrical conductivity is the same as that of the conductive film of the comparative example, a film thickness of the conductive film 11 of the present embodiment can be reduced to one sixth or less of the film thickness of the conductive film of the comparative example.

In addition, the conductive film 11 of the present embodiment has metallic electrical conductivity in which the electrical conductivity increases as the temperature decreases in at least a part of the temperature range as described in Examples to be described later.

In addition, it is easily expected that a difference in thermal expansion coefficient between the metal oxide of the present embodiment and a metal oxide used as an element material in a physical element is smaller than that of a metal material generally used as an electrode. Therefore, the conductive film 11 of the present embodiment is less likely to be peeled off from the substrate 12 than a conductive film made of a metal material generally used as an electrode.

The metal oxide of the present embodiment has a chemical bond and a crystal structure similar to those of the metal oxide used as the element material in the physical element. Therefore, when a laminated structure is formed by the conductive film 11 of the present embodiment and the element material, good lattice matching can be realized. Factors such as defects and interface layers that inhibit element performance can be greatly reduced.

In addition, it is easily expected that a melting point of the metal oxide of the present embodiment is higher than that of a metal material generally used as an electrode. Therefore, in a manufacturing method of the physical element using the metal oxide as the element material, it is possible to perform a heating process at a higher temperature than in the case of using the metal material generally used as the electrode.

Examples

The present inventors formed a thin film of $(BaO)_2Ti_6O_{11}$ as the conductive film 11 of each of Examples 1 to 3 on the (210) plane of the substrate 12 of $SrTiO_3$ by a laser ablation method. A target used in the laser ablation method was a sintered body having a molar ratio of Ba:Ti:O of 1:3:x. A substrate surface was the (210) plane of $SrTiO_3$. A laser used in the laser ablation method was a KrF pulse laser. A laser fluence (that is, a laser irradiation energy density) was 0.6 $J \cdot cm^{-2}$. A spot size of the irradiation laser was 0.024 $cm^2$. A degree of vacuum in a container in which the substrate 12 was placed during film formation was $1.0 \times 10^{-5}$ Pa. A substrate temperature was 1000° C. A laser irradiation frequency was 2 Hz. A film thickness of the conductive film 11 of Example 1 was about 100 nm. A film thickness of the conductive film 11 of Example 2 was about 200 nm. A film thickness of the conductive film 11 of Example 3 was about 20 nm.

The conditions for forming the conductive film 11 are not limited to those in Examples 1 to 3, but the laser fluence is desirably set to a minimum value of 0.5 $J \cdot cm^{-2}$ or more necessary for ablation from the target. In addition, it is preferable that the laser fluence is set to be equal to or less than a value at which a ratio of a plurality of ablated metal chemical species is kept spatially uniform. A substrate temperature and an oxygen partial pressure during ablation are preferably 800° C. or more and 1500° C. or less and $1 \times 10^{-6}$ Pa or more and $1 \times 10^{-3}$ Pa or less, respectively. This is to achieve a reducing atmosphere in the container in which Ti species during ablation can be stabilized below the maximum oxidation number on the substrate.

[Structure of Thin Film of $(BaO)_2Ti_6O_{11}$]

Figure 5:
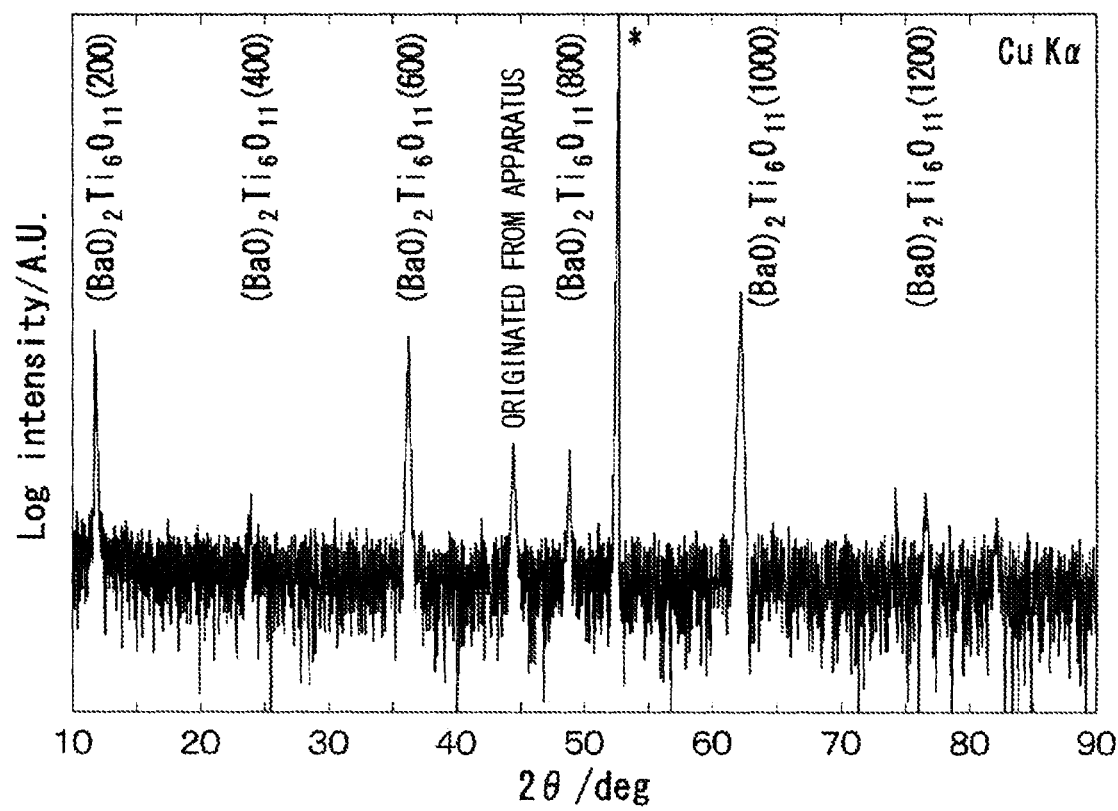
FIG. 5 is a diagram showing an X-ray diffraction pattern of a thin film of $(BaO)_2Ti_6O_{11}$.

FIG. 5 shows an X-ray diffraction pattern of a thin film of $(BaO)_2Ti_6O_{11}$. The X-ray diffraction pattern was measured using SmartLab (Rigaku Corporation, X-ray source CuKα 0.1542 nm). As shown in FIG. 5, since peaks corresponding to the L00 (L=2, 4, 6, 8, 10, 12) plane of $(BaO)_2Ti_6O_{11}$ were observed, it can be seen that conductive film 11 was oriented along an a-axis with respect to the main surface of substrate 12. In FIG. 5, "*" corresponds to a (210) diffraction peak of $SrTiO_3$.

Figure 6A:
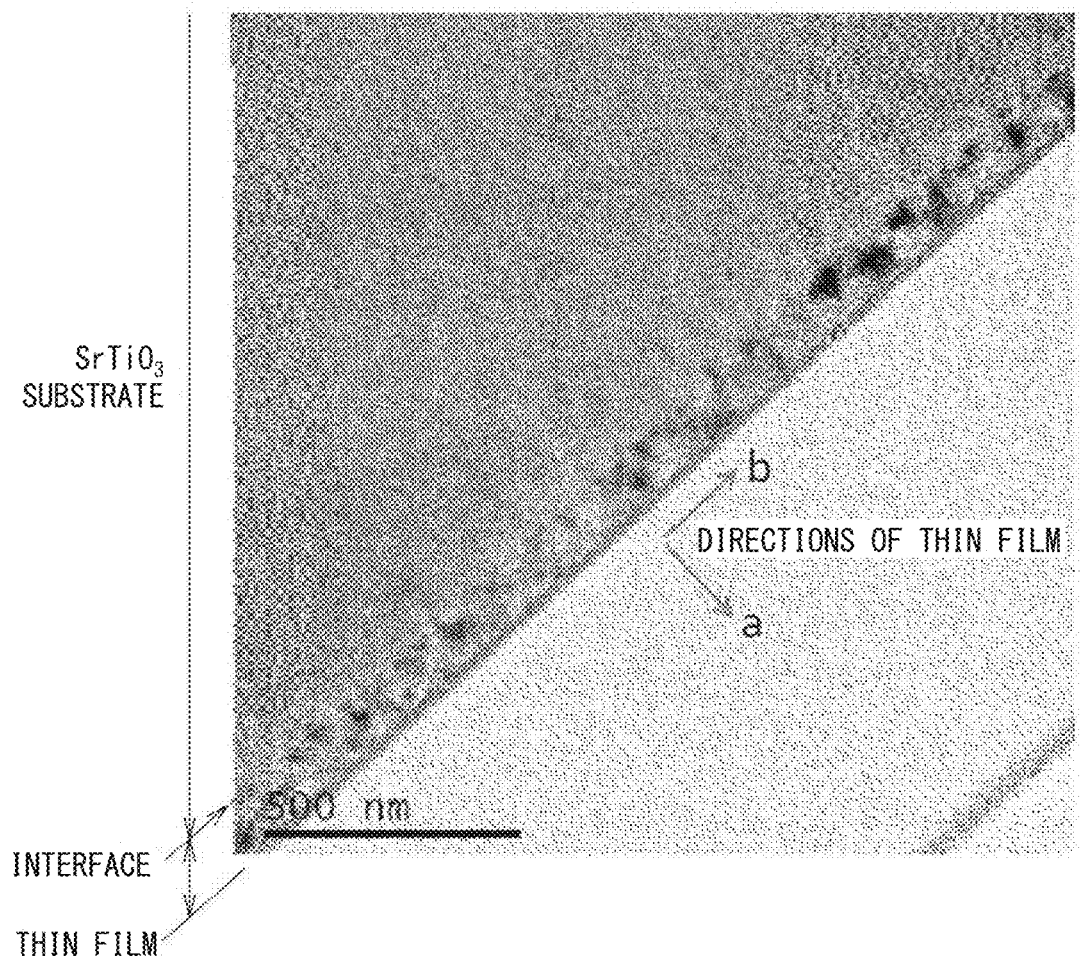
FIG. 6A is a diagram showing a bright field image of a substrate of $SrTiO_3$ and a thin film of $(BaO)_2Ti_6O_{11}$ observed with a transmission electron microscope (TEM)
Figure 6B:
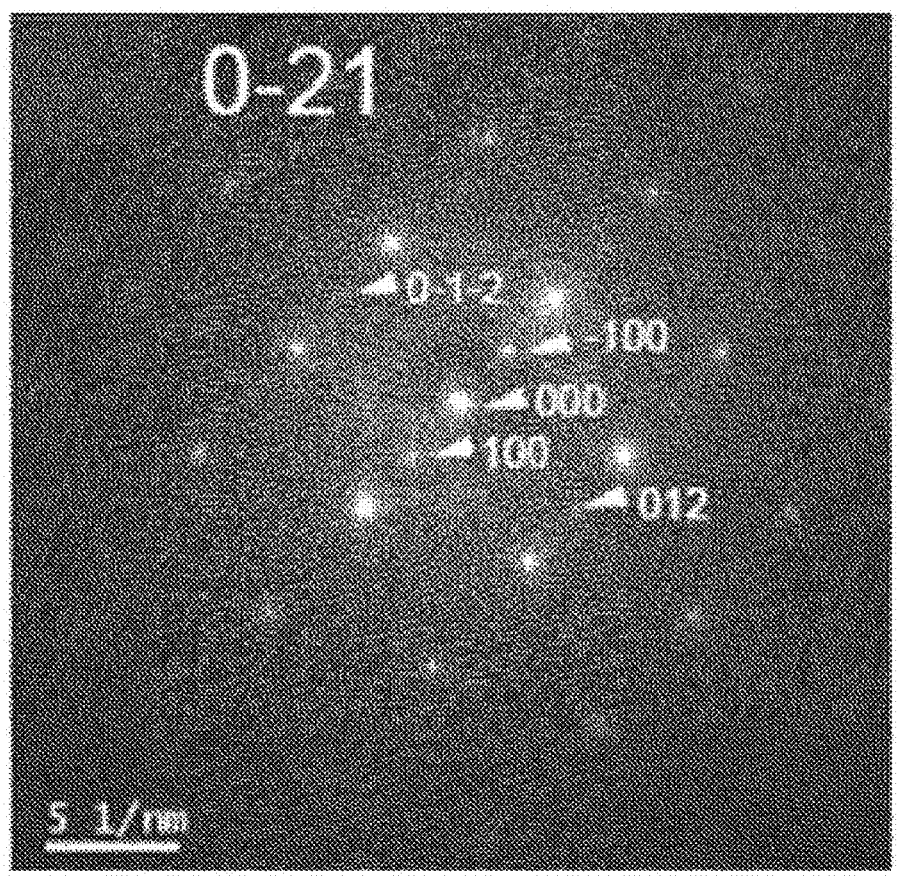
FIG. 6B is a diagram showing a diffraction pattern of the substrate of $SrTiO_3$ observed with the TEM.
Figure 6C:
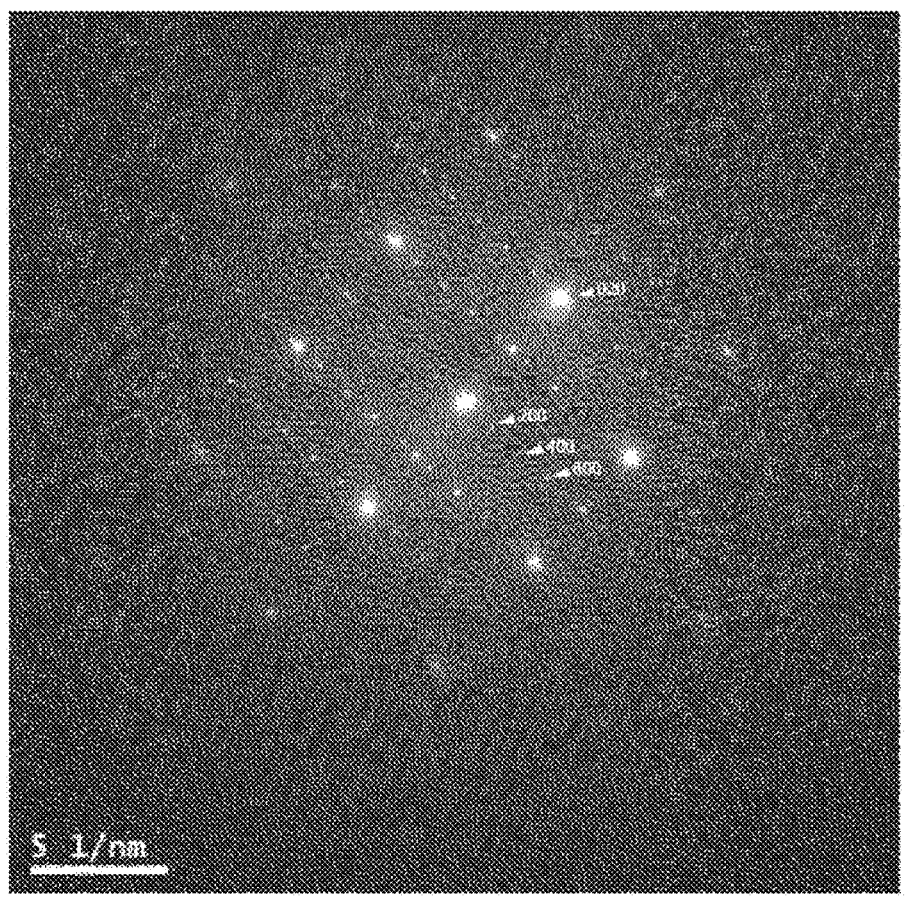
FIG. 6C is a diagram showing a diffraction pattern of the substrate of $SrTiO_3$ and the thin film of $(BaO)_2Ti_6O_{11}$ observed with the TEM.

FIGS. 6A to 6C are diagrams for explaining structural analysis results of the thin film of $(BaO)_2Ti_6O_{11}$. FIG. 6A shows a bright field image of the substrate 12 of $SrTiO_3$ and the thin film of $(BaO)_2Ti_6O_{11}$ observed with a TEM. FIG. 6B shows a diffraction pattern of only the substrate 12 of $SrTiO_3$ observed with the TEM. FIG. 6C shows a diffraction pattern of the substrate 12 of $SrTiO_3$ and the thin film of $(BaO)_2Ti_6O_{11}$ observed with the TEM. The lattice constants in the thin film are slightly different from the lattice constants in the powder due to constraints from the substrate 12. However, the TEM diffraction pattern shown in FIG. 6C generally coincides with a theoretical pattern calculated based on an atomic arrangement of $(BaO)_2Ti_6O_{11}$ shown in FIG. 2, FIG. 3A, and FIG. 3B. Therefore, these structural analysis results indicated that the thin film of $(BaO)_2Ti_6O_{11}$ had a crystal structure similar to the crystal structure of $(BaO)_2Ti_6O_{11}$ shown in FIG. 2, FIG. 3A, and FIG. 3B.

Figure 8:
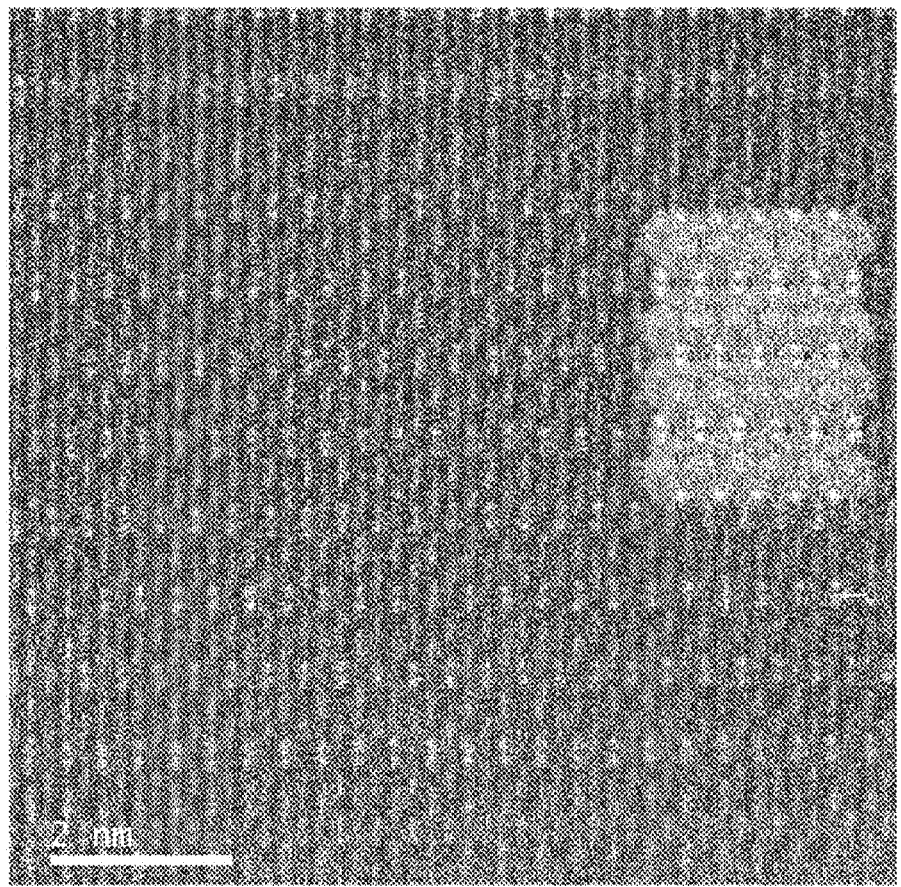
FIG. 8 is a diagram in which an atomic arrangement of $(BaO)_2Ti_6O_{11}$ is superimposed on the HAADF-STEM image of the thin film of $(BaO)_2Ti_6O_{11}$.

FIG. 7A shows a bright field image (BF-STEM image) of the thin film of $(BaO)_2Ti_6O_{11}$ observed with a scanning transmission electron microscope (STEM), and FIG. 7B shows a high angle annular dark field image (HAADF-STEM image) of the thin film of $(BaO)_2Ti_6O_{11}$ observed with the STEM. These STEM images were measured using ARM-200FC (JEOL Ltd.), which is a 200 kV spherical aberration corrector mounting machine. It was shown that the thin film of $(BaO)_2Ti_6O_{11}$ had a layered structure indicated by arrows in FIG. 7A and FIG. 7B. In FIG. 8, the atomic arrangement of $(BaO)_2Ti_6O_{11}$ shown in FIG. 3A is superimposed on the HAADF-STEM image of the thin film of $(BaO)_2Ti_6O_{11}$. It was shown that the thin film of $(BaO)_2Ti_6O_{11}$ had a crystal structure similar to that of $(BaO)_2Ti_6O_{11}$ shown in FIG. 3A.

[Electrical Characteristics of Thin Film of $(BaO)_2Ti_6O_{11}$]

The present inventors measured an electrical conductivity of the thin film of $(BaO)_2Ti_6O_{11}$, which is the conductive film 11 of Example 1, by a four-point probe method. An ammeter used for the measurement was 220 PROGRAMMABLE CURRENT SOURCE (Keithley Instruments). A voltmeter used for the measurement was 6517A ELECTROMETER/HIGH RESISTANCE METER (Keithley Instruments). A temperature controller used for the measurement was a cryogenic refrigerator system for electrical measurement PE0-101D-8 (Pascal Corporation). A cooling mechanism used for the measurement was a PE-101 type cryosystem. An electrode used for the measurement was TK paste CN-7120 (Kakentech Co., Ltd.). Temperatures at the time of measurement were temperatures at intervals of 10 K from 10 K to room temperature. A pressure during the measurement was about 5 Pa. A current value I was set to +100 mA and −100 mA, an average voltage Vave in both directions was calculated, and a resistance value was obtained as Vave/I. The measurement conditions are not limited thereto.

Figure 9:
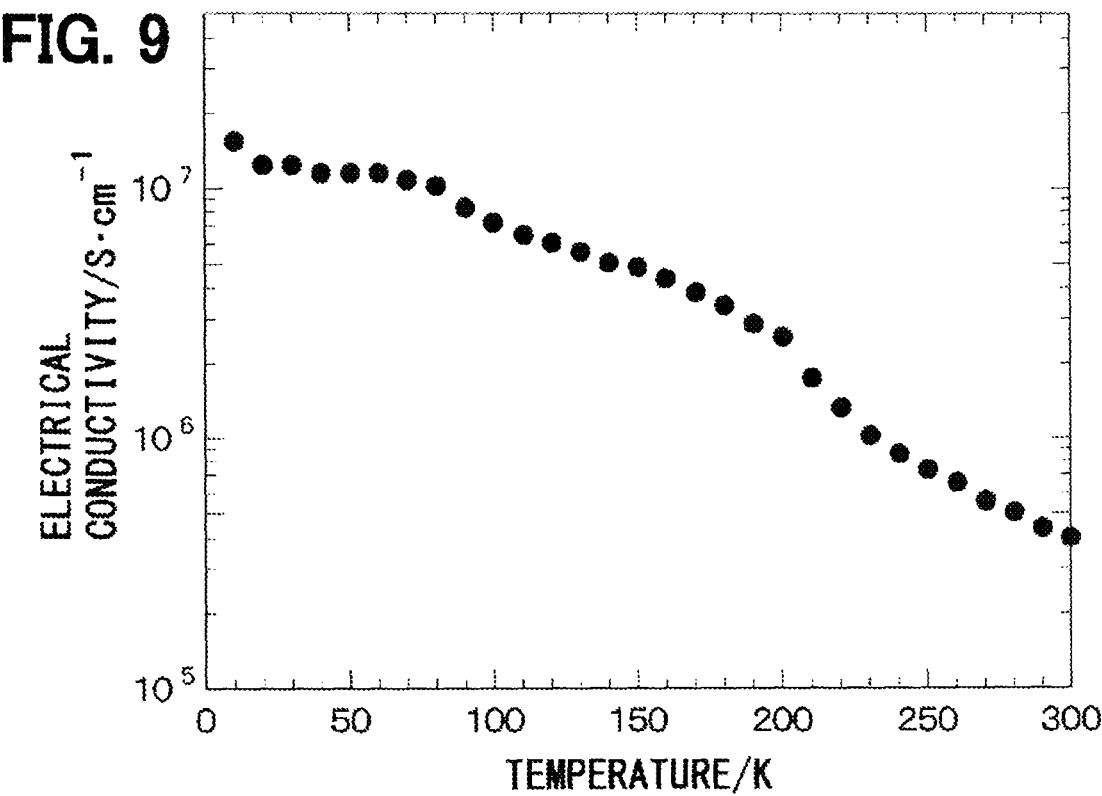
FIG. 9 is a graph showing a temperature dependency of an electrical conductivity of the thin film of $(BaO)_2Ti_6O_{11}$.
Figure 10:
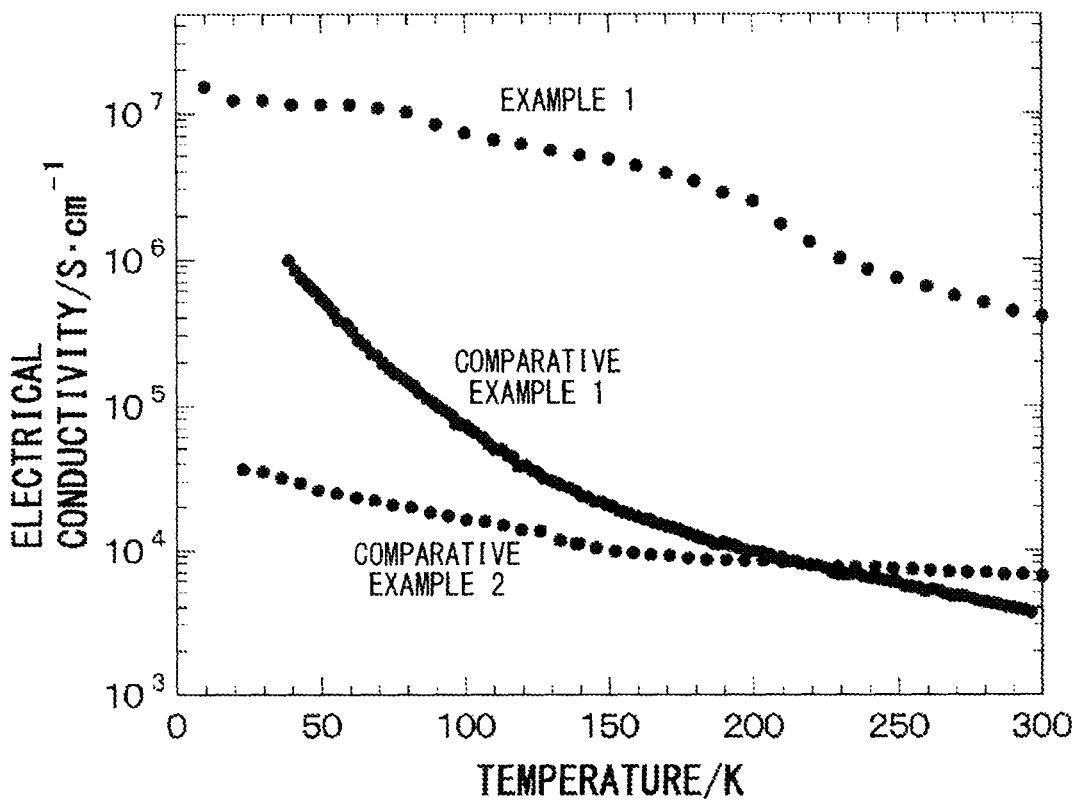
FIG. 10 is a graph showing a temperature dependency of an electrical conductivity of each of the thin film of $(BaO)_2Ti_6O_{11}$, which is the conductive film of Example 1, a thin film of $SrRuO_3$, which is a conductive film of Comparative Example 1, and a thin film of $SrTiO_{3-x}$, which is a conductive film of Comparative Example 2.

FIG. 9 shows a temperature dependency of an electrical conductivity of the thin film of $(BaO)_2Ti_6O_{11}$, which is the conductive film 11 of Example 1. FIG. 10 shows a temperature dependency of an electrical conductivity of each of $(BaO)_2Ti_6O_{11}$ which is the conductive film 11 of Example 1, a thin film of $SrRuO_3$ which is a conductive film of Comparative Example 1, and a thin film of $SrTiO_{3-x}$ which is a conductive film of Comparative Example 2. The electrical conductivity of the thin film of $(BaO)_2Ti_6O_{11}$ was about 3 to $4\times10^5$ S·cm$^{-1}$ at room temperature. As can be seen from the comparison between Example 1 and Comparative Examples 1 and 2, the electrical conductivity of the thin film of $(BaO)_2Ti_6O_{11}$ was extremely high as an oxide-based compound. The electrical conductivity of the thin film of $(BaO)_2Ti_6O_{11}$ increased with decrease in the temperature, and exhibited metallic behavior.

Figure 11:
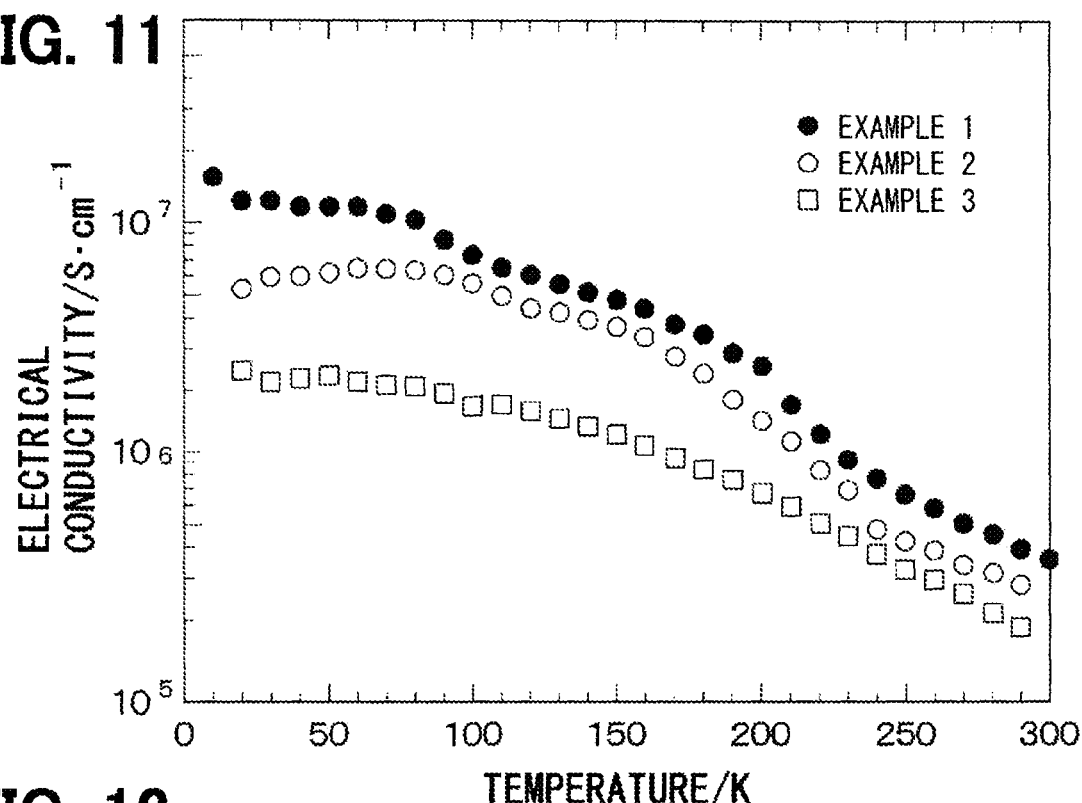
FIG. 11 is a graph showing a temperature dependency of an electrical conductivity of each of the thin films of $(BaO)_2Ti_6O_{11}$ of Examples 1, 2, and 3.

FIG. 11 shows a temperature dependency of an electrical conductivity of each of the thin films of $(BaO)_2Ti_6O_{11}$ of Examples 1, 2, and 3. In the thin film of Example 2, the film thickness is increased more than that of the thin film of Example 1 in order to reduce an influence of an interface portion between the substrate 12 and the thin film. As shown in FIG. 11, each of the thin films of Examples 2 and 3 exhibited very high electrical conductivity as with the thin film of Example 1. Therefore, it was confirmed that the high electrical conductivity of the thin film of Example 1 did not occur at the interface portion with the substrate 12.

Figure 12:
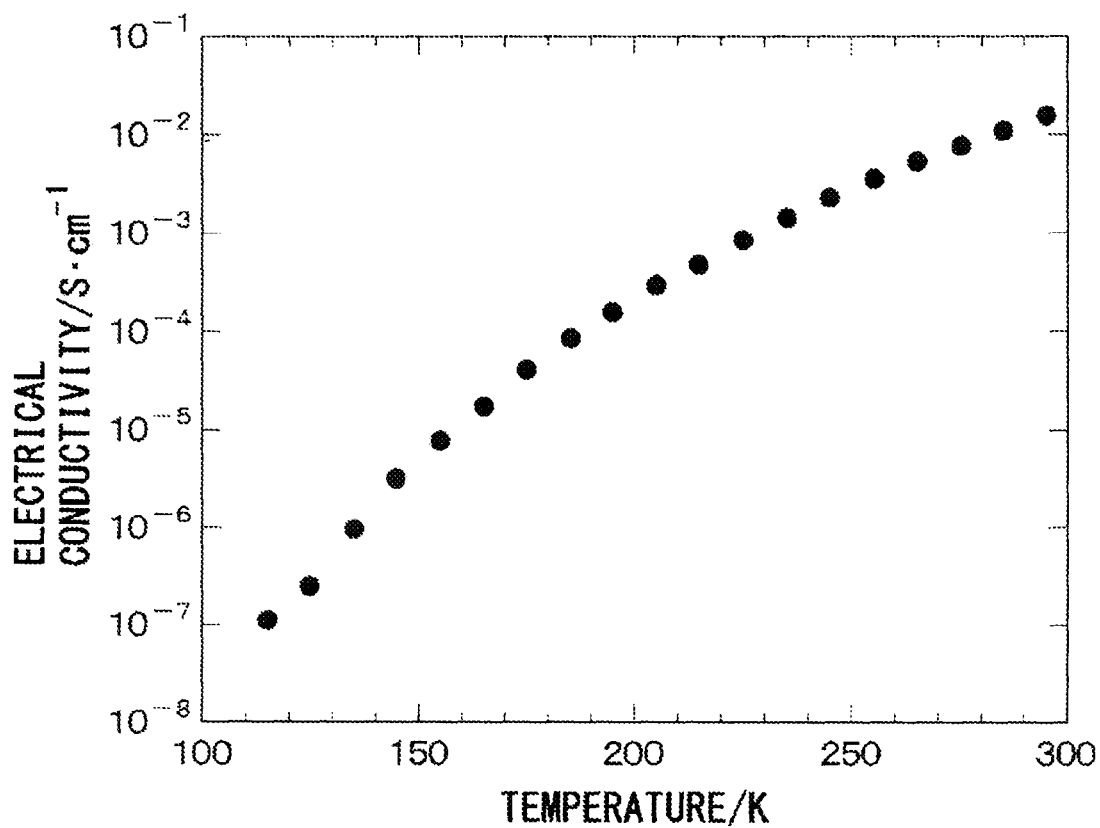
FIG. 12 is a graph showing a temperature dependency of an electrical conductivity of a sintered body of $(BaO)_2Ti_6O_{11}$.

FIG. 12 shows a temperature dependency of an electrical conductivity of a sintered body of $(BaO)_2Ti_6O_{11}$ as Comparative Example 3. The sintered body of $(BaO)_2Ti_6O_{11}$ is a polycrystalline body. The electrical conductivity of the sintered body of $(BaO)_2Ti_6O_{11}$ was lower than the electrical conductivity of the thin film of $(BaO)_2Ti_6O_{11}$, and exhibited semiconductor-like behavior. Although the film and the sintered body have the same structure, a large difference in electrical conductivity was observed. It is considered that the anisotropy of electrical conductivity is strong as seen in the crystal structure of $(BaO)_2Ti_6O_{11}$ in FIG. 3A and FIG. 3B, and thus scattering of electrons by grain boundaries in the sintered body, formation of an internal electric field, and the like cause the large difference.

Figure 13:
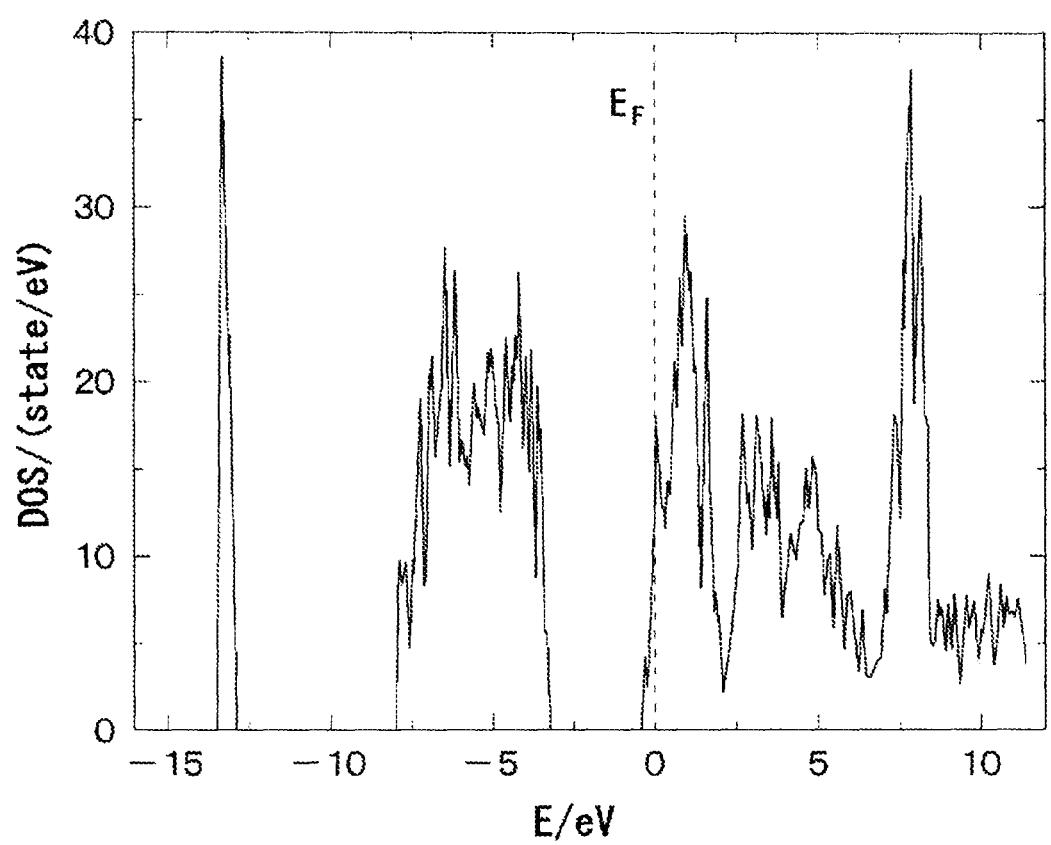
FIG. 13 is a graph showing a state density of $(BaO)_2Ti_6O_{11}$ calculated by a density functional theory (DFT)

FIG. 13 shows a state density of $(BaO)_2Ti_6O_{11}$ calculated by a density functional theory (DFT). The Fermi level (EF) exists in the vicinity of a conduction band edge. This suggests that $(BaO)_2Ti_6O_{11}$ has metallic electrical properties. The state density shown in FIG. 13 were in good agreement with the measured metallic electrical conductivity.

Figure 14A:
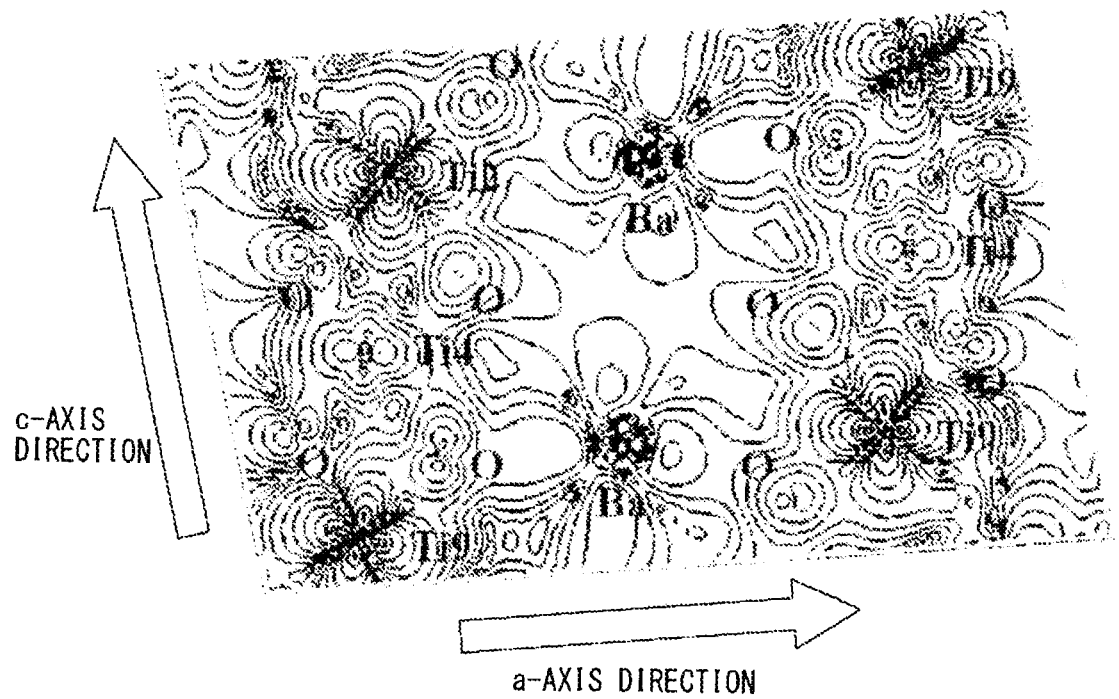
FIG. 14A is a diagram showing an electron density map in an ac-plane of $(BaO)_2Ti_6O_{11}$ calculated by the DFT.
Figure 14B:
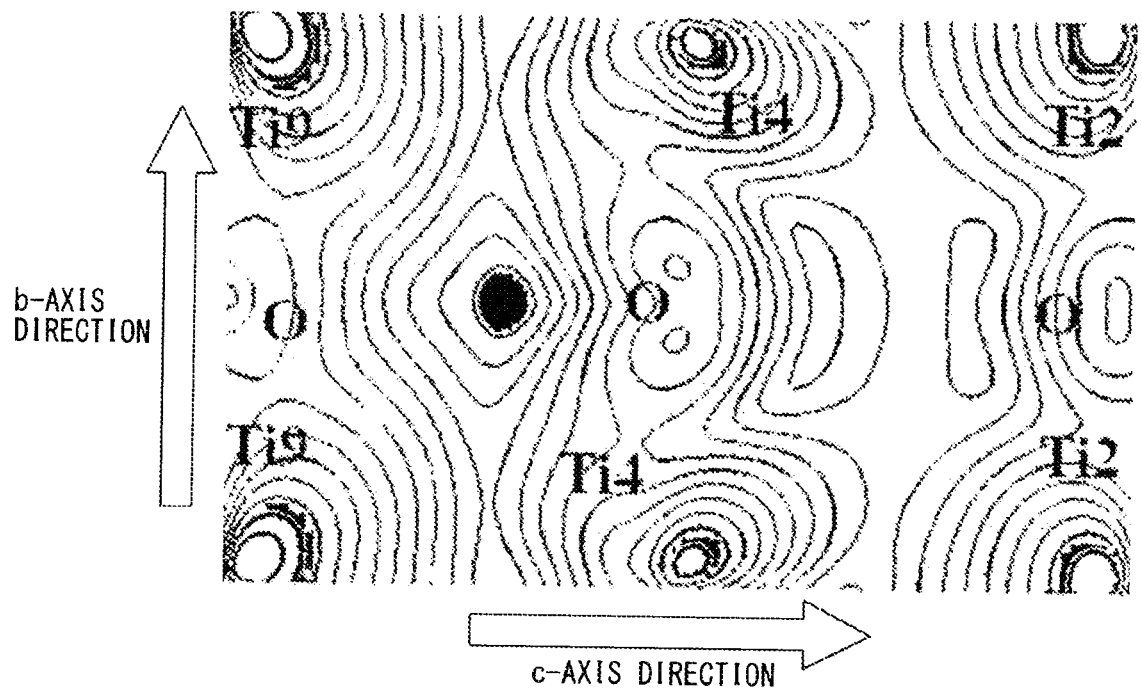
FIG. 14B is a diagram showing an electron density map in a bc-plane of $(BaO)_2Ti_6O_{11}$ calculated by the DFT.

FIG. 14A shows an electron density map in an ac-plane of $(BaO)_2Ti_6O_{11}$ calculated by the DFT. FIG. 14B shows an electron density map in a bc-plane of $(BaO)_2Ti_6O_{11}$ calculated by the DFT. Ti and its number described in each of FIG. 14A and FIG. 14B indicate the number, that is, the position of the Ti atom in the unit cell of FIG. 2. As described above, $(BaO)_2Ti_6O_{11}$ has the unit structures in each of which $TiO_6$ octahedrons are connected in layers, and has a layered structure in which the unit structures and Ba layers disposed between the unit structures are alternately layered. In the structure of $Ti_6O_{11}$, electrons injected from Ba spread in connected $TiO_6$ octahedrons. FIG. 14A shows a state in which electrons spread in the c-axis direction. FIG. 14B shows a state in which electrons spread in the b-axis direction. In the Ba layers, as shown in FIG. 14A, the electron density does not spread from the $TiO_6$ layers but is concentrated on Ba ions. These results indicate that, in $(BaO)_2Ti_6O_{11}$, conduction electrons propagate inside clean $TiO_6$, which is less susceptible to scattering, and show good agreement with the observed high electrical conductivity.

From the above consideration, it is considered that the extremely high electrical conductivity of the thin film of $(BaO)_2Ti_6O_{11}$ is caused by the following (i) to (iii) and the like:

(i) $(BaO)_2Ti_6O_{11}$ has a crystal structure in which the layered unit structures of one type in each of which $TiO_6$ octahedrons are connected in layers are repeatedly arranged, and Ba is present in the gaps between the unit structures;

(ii) The valence of Ti becomes less than $Ti^{4+}$ by the additional metal element Ba, and therefore electrons are injected; and (iii) The supplied electrons are conducted inside the clean $TiO_6$ octahedrons in which the disturbance of the unit structures is small without being scattered by the donor impurity.

The composition of the metal oxide of the above embodiment, the type of the substrate used for forming the film, and the like are preferably adjusted so as to satisfy these conditions.

[Evaluation of Ti Valence]

In order for $(BaO)_2Ti_6O_{11}$ to have electrical conductivity, the presence of conduction electrons is essential. Similarly to other titanium oxides, the presence of electrons can be confirmed by the valence of Ti being less than +4, which is the maximum oxidation number of Ti. In order to evaluate the valence of Ti in $(Ba)_2Ti_6O_{11}$, the present inventors measured an electron energy loss spectrum (EELS) using ARM-200FC (JEOL Ltd.).

FIG. 15A shows L-edge spectra of Ti (Ti L-edge) and FIG. 15B shows K-edge spectra of O (O K-edge spectrum). Of the five spectra in FIG. 15A and FIG. 15B, the second spectrum from the top is the spectrum of the thin film of $(BaO)_2Ti_6O_{11}$ of Example 1. The third spectrum from the top is a spectrum of $TiO_2$. The fourth spectrum from the top is a spectrum of $Ti_2O_3$, and the fifth spectrum from the top is a spectrum of TiO. The intensities of the peak A and the peak B differ depending on the valence of Ti. Therefore, the Ti valence of the metal oxide of the above embodiment can be evaluated from the intensity ratio of the peak A and the peak B.

Figure 15C:
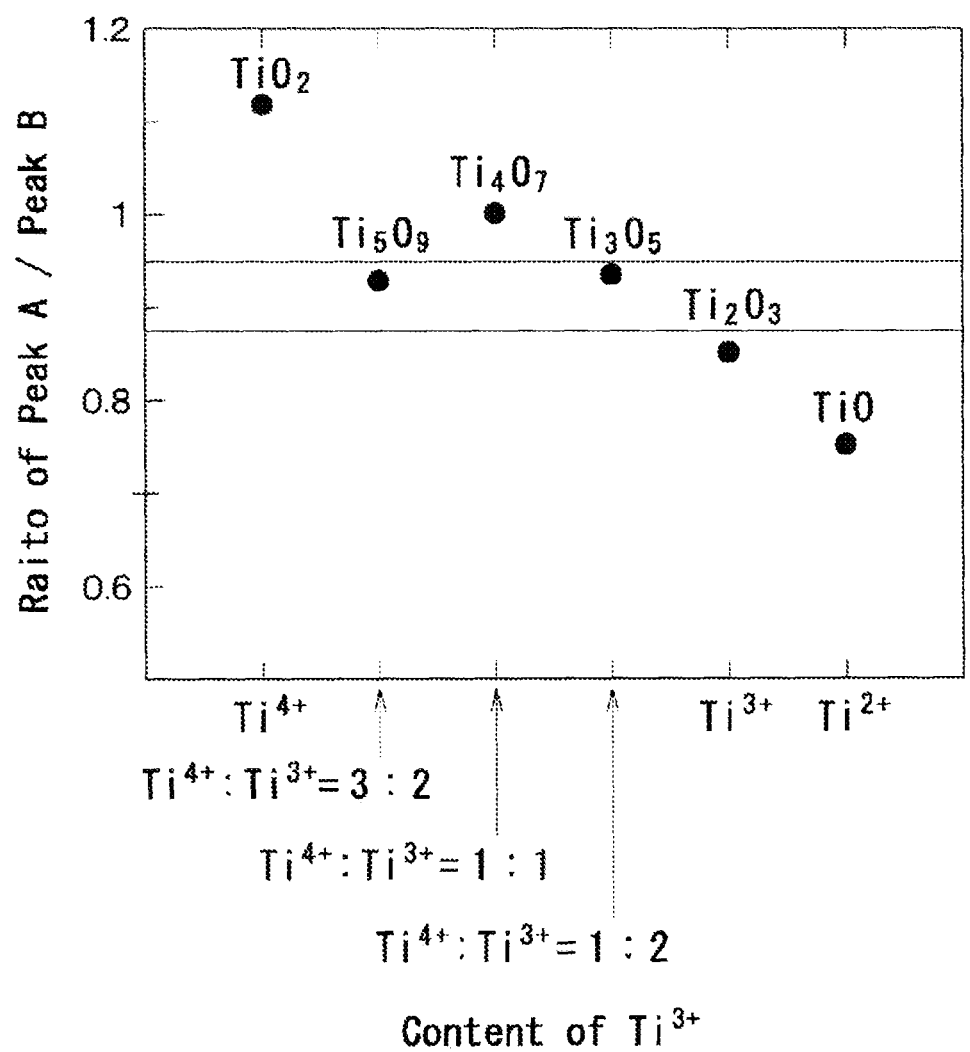
FIG. 15C is a graph showing ratios of $Ti^{4+}$ to $Ti^{3+}$ obtained from the EELS analysis results of FIG. 15A and FIG. 15B.

FIG. 15C shows the intensity ratios of the peak A to the peak B in the EELS spectra of various titanium oxides. The intensity ratio of the peak A to the peak B in the EELS spectrum of $(BaO)_2Ti_6O_{11}$ of Example 1 was about 0.87 to 0.95. From this, the valence of titanium in $(BaO)_2Ti_6O_{11}$ of Example 1 can be evaluated as $Ti^{3.5+}$ to $Ti^{3.6+}$ from $Ti^{4+}$:$Ti^{3+}$=about 3:2 to 1:2.

The present disclosure has been described above based on the examples. The examples are intended to be illustrative only and it will be obvious to those skilled in the art that various modifications to constituting elements and processes could be developed and that such modifications are also within the scope of the present disclosure.

What is claimed is:

1. A conductive film comprising a metal oxide as a main component, wherein
the metal oxide contains same components as components of a compound represented by a formula (I):

$$(AO)_2B_6O_{11} \tag{I}$$

where A in the formula (I) is a metal element capable of having a valence of +1 or +2, B in the formula (I) is a transition metal element capable of having a valence of +4 or +5, O in the formula (I) is an oxygen element, and an average valence of B in the formula (I) is less than a maximum oxidation number of B, and
the metal oxide has a crystal structure in which diffraction peaks in an X-ray diffraction pattern of the metal oxide appear at same diffraction angles as diffraction angles at which diffraction peaks in an X-ray diffraction pattern of the compound represented by the formula (I) appear.

2. The conductive film according to claim 1, wherein A in the formula (I) is one or more elements selected from a group consisting of Ca, Sr, Ba, Na, K, Rb, and Cs.

3. The conductive film according to claim 1, wherein B in the formula (I) is Ti.

4. The conductive film according to claim 1, wherein B in the formula (I) contains Ti and one or more elements different from Ti, and
the one or more elements different from Ti are selected from a group consisting of V, Cr, Mn, Fe, Co, Nb, Ru, Pd, Ta, W, Mo, Re, Os, Ir, and Pt.

5. The conductive film according to claim 1, wherein B in the formula (I) is at least one of Ta or Nb.

6. The conductive film according to claim 1, wherein B in the formula (I) contains at least one of Ta or Nb, and one or more elements different from Ta and Nb, and
the one or more elements different from Ta and Nb are selected from a group consisting of Ti, V, Mn, Fe, Co, Ru, Rh, Ir, Mo, and W.

7. A manufacturing method of a conductive film that includes a metal oxide as a main component, wherein
the metal oxide has same components as components of a compound represented by a formula (I):

$$(AO)_2B_6O_{11} \tag{I}$$

where A in the formula (I) is a metal element capable of having a valence of +1 or +2, B in the formula (I) is a transition metal element capable of having a valence of +4 or +5, O in the formula (I) is an oxygen element, and an average valence of B in the formula (I) is less than a maximum oxidation number of B, and
the metal oxide has a crystal structure in which diffraction peaks in an X-ray diffraction pattern of the metal oxide appear at same diffraction angles as diffraction angles at which diffraction peaks in an X-ray diffraction pattern of the compound represented by the formula (I) appear,
the manufacturing method comprising:
preparing a base member; and
forming the conductive film on a surface of the base member by a laser ablation method performed in an atmosphere containing oxygen gas and performed using a target containing a same element as A in the formula (I) and a same element as B in the formula (I).

8. The manufacturing method according to claim 7, wherein
the forming of the conductive film includes setting a temperature of the base member to 800° C. or more and 1500° C. or less, and setting an oxygen partial pressure of the atmosphere to $1 \times 10^{-6}$ Pa or more and $1 \times 10^{-3}$ Pa or less.

* * * * *